(12) United States Patent  (10) Patent No.: US 8,219,123 B2
Deutsch et al.  (45) Date of Patent: Jul. 10, 2012

(54) PERSONALIZED MULTIMEDIA MESSAGING SYSTEM

(75) Inventors: Joseph Deutsch, Tel Aviv (IL); David Zviel, Efrat (IL)

(73) Assignee: NDS Limited, Middlesex (GB)

( * ) Notice: Subject to any disclaimer, the term of this patent is extended or adjusted under 35 U.S.C. 154(b) by 1312 days.

(21) Appl. No.: 10/590,002

(22) PCT Filed: Mar. 23, 2004

(86) PCT No.: PCT/IL2004/000261
§ 371 (c)(1), (2), (4) Date: Jul. 9, 2007

(87) PCT Pub. No.: WO2005/091537
PCT Pub. Date: Sep. 29, 2005

(65) Prior Publication Data
US 2007/0275740 A1  Nov. 29, 2007

(51) Int. Cl.
*H04M 11/06* (2006.01)
(52) U.S. Cl. ..................... 455/466; 455/412.1
(58) Field of Classification Search ............... 455/412.1, 455/420, 456.1, 466; 709/206, 246
See application file for complete search history.

(56) References Cited

U.S. PATENT DOCUMENTS

| | | | |
|---|---|---|---|
| 6,763,373 B2 | 7/2004 | Shiigi | |
| 6,775,560 B2 | 8/2004 | King et al. | |
| 2003/0227916 A1 | 12/2003 | Paila et al. | |
| 2004/0111476 A1* | 6/2004 | Trossen et al. | 709/206 |
| 2004/0198279 A1* | 10/2004 | Anttila et al. | 455/179.1 |
| 2005/0075093 A1* | 4/2005 | Lei et al. | 455/412.1 |
| 2005/0174261 A1 | 8/2005 | Laumen et al. | |
| 2006/0031297 A1* | 2/2006 | Zuidema | 709/206 |

FOREIGN PATENT DOCUMENTS

| | | |
|---|---|---|
| DE | 102 25 425 | 12/2003 |
| EP | 113 631 | 11/2000 |
| EP | 1 255 416 | 5/2001 |
| EP | 1 271 970 | 6/2001 |
| EP | 1 289 322 | 3/2003 |
| WO | 01/33781 | 5/2001 |
| WO | 01/33782 | 5/2001 |
| WO | 02/43414 | 5/2002 |
| WO | 03/053092 | 6/2003 |

OTHER PUBLICATIONS

Examination Report of Jun. 9, 2008 in European application 04722628.7.
European Search Report dated Feb. 26, 2010 in Application No. 09012016.3.
European Search Report dated Feb. 25, 2010 in Application No. 09012015.5.

(Continued)

*Primary Examiner* — Ajit Patel
*Assistant Examiner* — Myron Wyche
(74) *Attorney, Agent, or Firm* — Finnegan, Henderson, Farabow, Garrett & Dunner, LLP

(57) ABSTRACT

A method for providing a personalized multimedia messaging service, wherein the method includes obtaining an MMS message (800). Recipient according to preferences of the at least one targeted recipient (900), thereby producing a personalized MMS message (910), and transmitting the personalized MMS message to the at least one targeted recipient indicate (1000) that the at least one targeted recipient is not interested in receiving the personalized MMS message.

9 Claims, 8 Drawing Sheets

OTHER PUBLICATIONS

List of demo products by Internexium, Feb. 22, 2004, [online], [retrieved on Nov. 8, 2006]. Retrieved from Internet Archive using Internet <URL:http:/web.archive.org/web/200402222168/http://internexium.com/demo.htm>; location was found in a search to correspond to the website <URL: http:/www.internexium.com/demo/htm.>.

Online demonstration of an MMs composer by Alatto3g, Feb. 14, 2004, [online], [retrieved on Oct. 29, 2006] Retrieved from Internet Archive using Internet <URL: http:/web.archive.org/web/20040214055952/http:/alatto.com/index.htm#>, location was found in a search to correspond to the website <URL:http:/alatto3g.com/mmsdemo/alatto/composer.jsp.>.

MMS Wireless Will Lack Real Content. Press Release dated Apr. 7, 2003 [online], [retrieved on Jul. 3, 2003]. Retrieved from the Internet <URL: http:/www.3g.co.uk/PR/April2003/5184.htm.>.

Andreadis, Alessandro et al; Protocols for High-Efficiency Wireless Networks; Section 3.6 pp. 82-85.

Ralph, Daniel et al.; MMS: technologies, usage and business models (Section 7.10, pp. 291-292).

\* cited by examiner

FIG. 6C
FIG. 6D
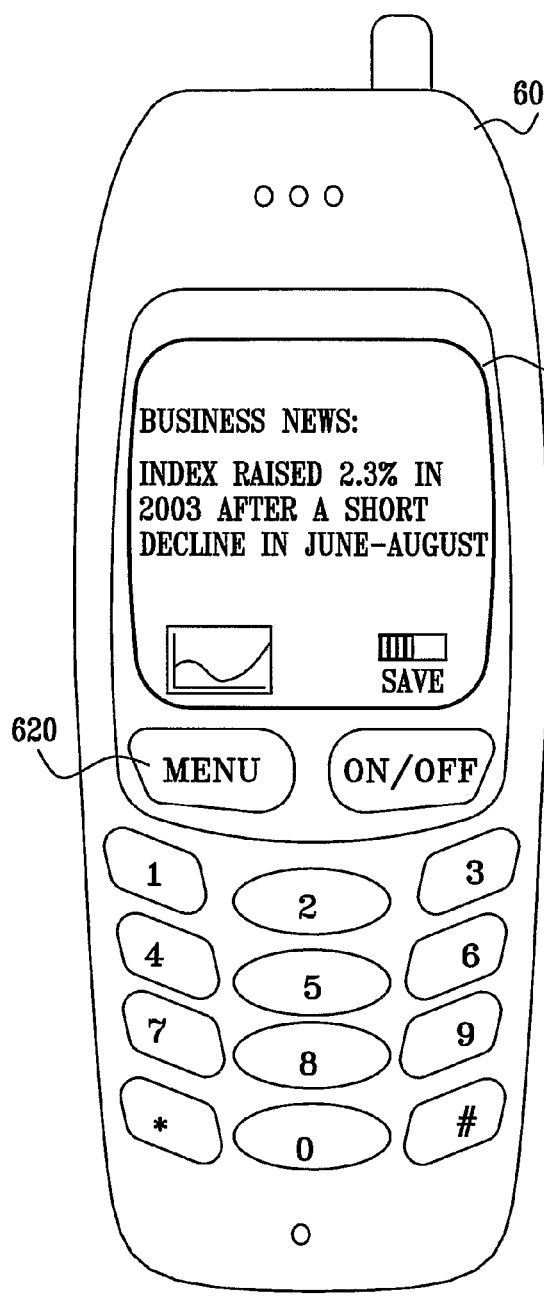
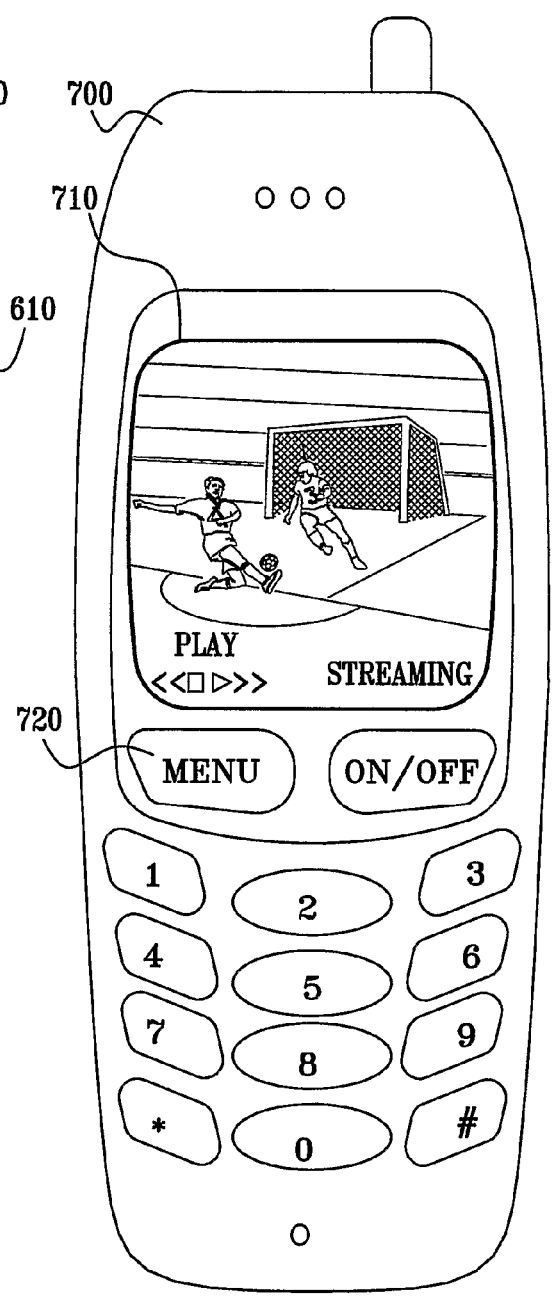

PERSONALIZED MULTIMEDIA MESSAGING SYSTEM

CROSS-REFERENCE TO RELATED APPLICATIONS

The present application is a 35 USC §371 application of PCT/IL2004/000261, filed on 23 Mar. 2004 and entitled "PERSONALIZED MULTIMEDIA MESSAGING SYSTEM", which was published on 29 Sep. 2005 in the English language with International Publication Number WO 2005/091537.

FIELD OF THE INVENTION

The present invention relates to messaging systems in general and particularly, but not exclusively, to messaging systems that enable a multimedia messaging service (MMS).

BACKGROUND OF THE INVENTION

Multimedia messaging service (MMS) is conceived as an evolution of the popular short messaging service (SMS) that is provided by many cellular telephone operators. In MMS, a user or a content provider may transmit to a recipient, or to a plurality of recipients, messages with rich content such as video, audio, stills images and text; SMS is typically limited to text.

Demonstrations of creation and use of MMS messages are found at the following web sites: www.alatto3g.com/mms-demo/alatto/composer.jsp; and www.internexium.com/demo.htm. Typically, MMS messages are expected to include some form of Digital Rights Management (DRM) as mentioned in a press release dated 7 Apr. 2003 at www.3G.co.uk which is entitled "MMS Wireless Will Lack Real Content". DRM is required in order to avoid re-distribution of MMS messages by users without appropriate authorization from composers/creators of the MMS messages.

Some aspects of technologies and related art that may be useful in understanding the present invention are described in the following publications:

European patent application EP 1113631, which describes method and device for integrated multimedia messaging service;

Published PCT patent application WO 01/33781, which describes a method for implementing a multimedia messaging service, a multimedia messaging system, a server of a multimedia messaging system and a multimedia terminal;

Published PCT patent application WO 01/33782, which describes a method for implementing a multimedia messaging service between a terminal that communicates with a network over a radio path and a server;

Published PCT patent application WO 03/053092, which describes apparatus and method for offering event image mail service using multimedia messaging service;

European patent application EP 1271970, which describes methods, devices and software programs for processing and/or evaluating Multimedia Messaging Service (MMS) messages; and European patent application EP 1255416, which describes method and medium for storing and accessing MMS (Multimedia Messaging Service) information.

The disclosures of all references mentioned above and throughout the present specification, as well as the disclosures of all references mentioned in those references, are hereby incorporated herein by reference.

SUMMARY OF THE INVENTION

The present invention seeks to provide personalization techniques for MMS with improved capabilities for message presentation and for selection of content associated with MMS messages for display.

It is expected that MMS will appeal to users if at least some forms of personalization will be enabled by the service, such as personalization of presentation of MMS messages and personalization of options to view and select MMS messages for display.

There is thus provided in accordance with a preferred embodiment of the present invention a method for providing a personalized multimedia messaging service (MMS), the method including obtaining an MMS message, applying personalized metadata to the MMS message for at least one targeted recipient according to preferences of the at least one targeted recipient, thereby producing a personalized MMS message, and transmitting the personalized MMS message to the at least one targeted recipient, unless the preferences of the at least one targeted recipient indicate that the at least one targeted recipient is not interested in receiving the personalized MMS message.

Preferably, the preferences of the at least one targeted recipient include preferences related to content.

The MMS message preferably includes at least one of the following: content, at least one link to content, and at least one pointer to content. The content preferably includes at least one of the following: text, video, a stills image, audio, a software attachment, and bundled multimedia. Preferably, the bundled multimedia includes at least one of the following: pop-up multimedia, and animated multimedia. For example, the bundled multimedia may include at least one of the following: Shockwave™ multimedia, Flash™ multimedia, a synchronized multimedia integration language (SMIL) file, and a simple animation format (SAF) file.

Preferably, the personalized metadata includes at least one indicator of at least one of the following: a creator of the MMS message, a provider of at least some content comprised in or associated with the MMS message, an MMS message title keyword, sponsorship of at least some content comprised in or associated with the MMS message, cost of at least some content comprised in or associated with the MMS message, a category in the MMS message, a rating of the MMS message, a duration of at least some content comprised in or associated with the MMS message, a creation time of the MMS message, a validity period of the MMS message, a genre of the MMS message, details of a performer performing in at least some content comprised in or associated with the MMS message, and a type of content comprised in or associated with the MMS message.

Preferably, the obtaining includes obtaining the MMS message from at least one of the following: a content provider, and a user.

The personalized metadata preferably includes metadata determining a personalized format of presentation of the MMS message. The personalized format of presentation of the MMS message preferably includes at least one of the following: a personalized icon based format, and a personalized menu based format.

Additionally, the method also includes receiving the personalized MMS message at a communication appliance of the at least one targeted recipient. The communication appliance preferably includes at least one of the following: a cellular telephone, a portable communication device, a personal digital assistant (PDA), a computer based device with input/ output (I/O) capabilities, a set-top box (STB), and MMS message reception and display equipment.

There is also provided in accordance with a preferred embodiment of the present invention a method for providing a personalized multimedia messaging service (MMS), the method including receiving at a first communication appliance of a first user an MMS message personalized in accordance with preferences of the first user, and transmitting from the first communication appliance a request to transmit the MMS message to a second communication appliance of a second user.

Additionally, the method also includes receiving at the second communication appliance, in response to the transmitting, the MMS message personalized in accordance with preferences of the second user.

The preferences of the first user and the preferences of the second user preferably include preferences related to content.

The transmitting preferably includes transmitting the request to an MMS message dispatcher system.

The MMS message preferably includes at least one of the following: content, at least one link to content, and at least one pointer to content. The content preferably includes at least one of the following: text, video, a stills image, audio, a software attachment, and bundled multimedia. The bundled multimedia preferably includes at least one of the following: pop-up multimedia, and animated multimedia. For example, the bundled multimedia may include at least one of the following: Shockwave™ multimedia, Flash™ multimedia, a SMIL file, and a SAF file.

Preferably, each of the first communication appliance and the second communication appliance includes at least one of the following: a cellular telephone, a portable communication device, a PDA, a computer based device with I/O capabilities, an STB, and MMS message reception and display equipment.

Further in accordance with a preferred embodiment of the present invention there is provided a method for employing a personalized MMS message, the method including receiving the personalized MMS message, processing personalized metadata associated with the personalized MMS message to generate personalized parameters determining a format of presentation of at least a portion of content comprised in or associated with the personalized MMS message, and using the personalized parameters in an electronic content guide (ECG).

Preferably, the using includes employing at least some of the personalized parameters to create a personalized structure of the ECG.

Additionally, the method also includes enabling a user to view the at least a portion of content comprised in or associated with the personalized MMS message in response to an indication of agreement by the user to pay for viewing the at least a portion of content.

Alternatively or additionally, the method includes enabling a user to listen to the at least a portion of content comprised in or associated with the personalized MMS message in response to an indication of agreement by the user to pay for listening to the at least a portion of content.

Preferably, the format of presentation includes at least one of the following: an icon based format, and a menu based format. The format of presentation preferably includes a format of presentation adapted for performance of selections from the at least a portion of content comprised in or associated with the personalized MMS message.

There is also provided in accordance with a preferred embodiment of the present invention an MMS message dispatcher system including a dispatcher processor obtaining an MMS message, and applying personalized metadata to the MMS message for at least one targeted recipient according to preferences of the at least one targeted recipient, thereby producing a personalized MMS message, and a dispatcher transmitter operatively controlled by the dispatcher processor to transmit the personalized MMS message to the at least one targeted recipient, unless the preferences of the at least one targeted recipient indicate that the at least one targeted recipient is not interested in receiving the personalized MMS message.

Preferably, the preferences of the at least one targeted recipient include preferences related to content.

The MMS message is preferably created by at least one of the following: a content provider, and a user.

Additionally, the dispatcher system also includes a user preference database storing the preferences of the at least one targeted recipient.

The dispatcher transmitter preferably includes a cellular telephone transmitter.

The dispatcher system may be comprised in a mobile operator base station.

Also in accordance with a preferred embodiment of the present invention there is provided apparatus for employing a personalized MMS message, the apparatus including a receiver receiving an MMS message personalized in accordance with preferences of a first user, and a transmitter transmitting a request to transmit the MMS message to a communication appliance of a second user.

Further in accordance with a preferred embodiment of the present invention there is provided an MMS system including a first communication appliance of a first user, a second communication appliance of a second user, and an MMS message dispatcher system operative to perform the following operations: transmit to the first communication appliance an MMS message personalized in accordance with preferences of the first user, receive from the first communication appliance a request to transmit the MMS message to the second communication appliance, and transmit to the second communication appliance the MMS message personalized in accordance with preferences of the second user.

There is also provided in accordance with a preferred embodiment of the present invention apparatus for employing a personalized MMS message, the apparatus including a receiving element receiving the personalized MMS message, and a processor processing personalized metadata associated with the personalized MMS message to generate personalized parameters determining a format of presentation of at least a portion of content comprised in or associated with the personalized MMS message, and using the personalized parameters in an ECG.

The apparatus for employing a personalized MMS message may be comprised in a cellular telephone or a set-top box (STB).

BRIEF DESCRIPTION OF THE DRAWINGS

The present invention will be understood and appreciated more fully from the following detailed description, taken in conjunction with the drawings in which:

FIGS. 6A-6D together constitute simplified pictorial illustrations of examples of an electronic content guide (ECG) usable with the systems of FIGS. 1-4 and with the apparatus of FIG. 5, the ECG being constructed and operative in accordance with a preferred embodiment of the present invention;

DETAILED DESCRIPTION OF A PREFERRED EMBODIMENT

Figure 1:
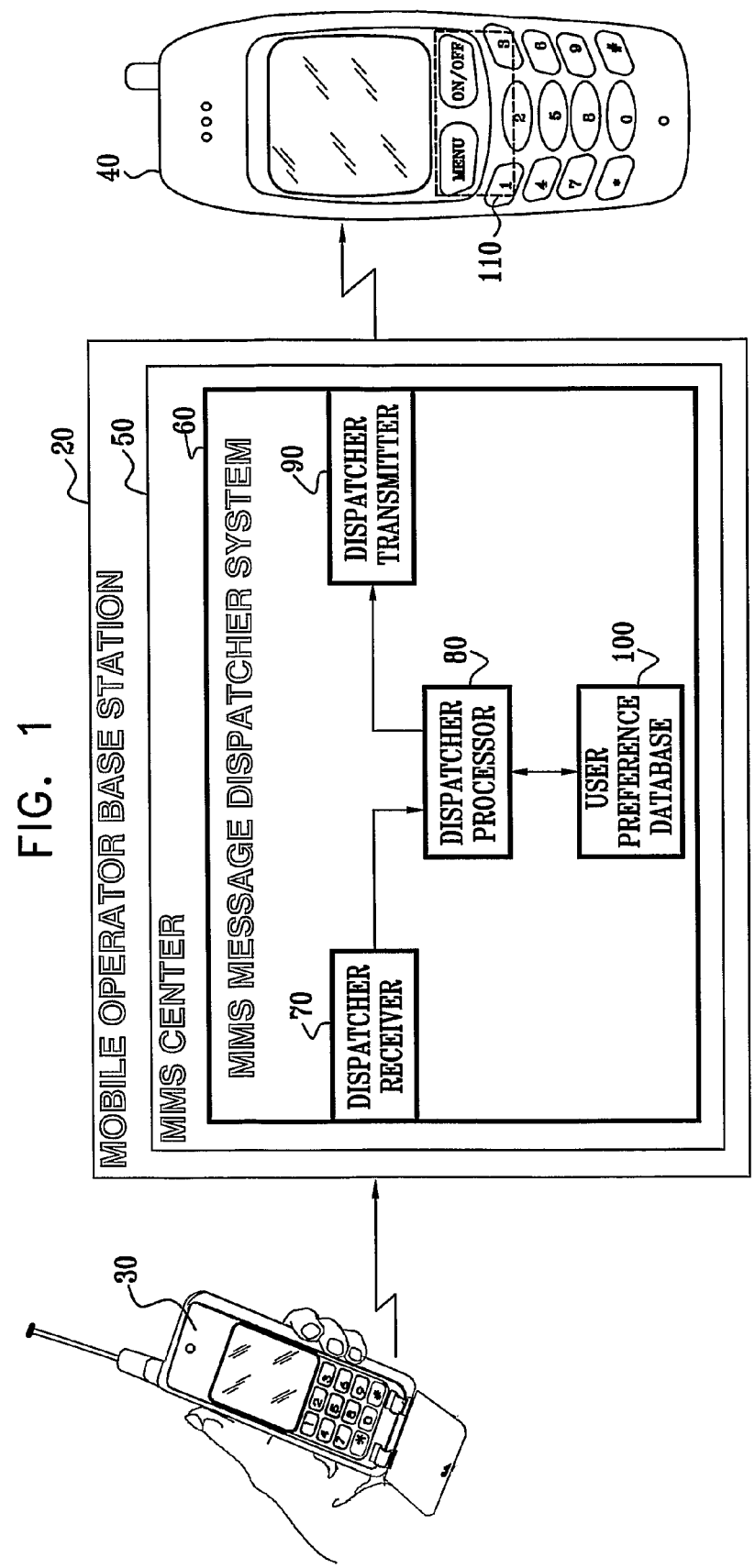
FIG. 1 is a simplified partly pictorial, partly block diagram illustration of a preferred implementation of an MMS communication system constructed and operative in accordance with a preferred embodiment of the present invention.

Reference is now made to FIG. 1, which is a simplified partly pictorial, partly block diagram illustration of a preferred implementation of an MMS communication system 10 constructed and operative in accordance with a preferred embodiment of the present invention.

The MMS communication system 10 preferably enables transmission of MMS messages from creators of the MMS messages to recipients of the MMS messages. The MMS communication system 10 may preferably include a cellular based communication network (not shown) that preferably employs cellular telephony links.

Preferably, the MMS communication system 10 includes a mobile operator base station 20. The mobile operator base station 20 preferably enables communication among a plurality or a multiplicity of communication appliances in the MMS communication system 10.

The term "communication appliance" is used throughout the present specification and claims to include a cellular telephone having MMS capability, or alternatively an appliance having cellular telephony links for communicating via an MMS communication system, or further alternatively an appliance adapted to communicate via an MMS communication system, such as one of the following: a portable communication device; a personal digital assistant (PDA); a computer based device with input/output (I/O) capabilities; a set-top box (STB); and MMS message reception and display equipment. It is appreciated that any one of the foregoing communication appliances that does not inherently include a display, such as the STB, may preferably be associated with a display for displaying MMS messages.

The terms "display" and "render", with reference to an MMS message, are used interchangeably throughout the present specification and claims to refer to any appropriate mechanism or method of making content palpable to one or more of the senses. In particular and without limiting the generality of the foregoing, "display" and "render" refer to display of images, video and other types of multimedia information as well as to playback of audio content. Further in particular and without limiting the generality of the foregoing, the terms "display" and "render" may also refer to application of any one or more of the following in an appliance that displays/renders the MMS message: a vibration effect; a lighting effect; and a sound effect.

For simplicity of depiction and description, and without limiting the generality of the foregoing, the communication appliances depicted in FIG. 1 and referred to herein below include cellular telephones. Further for simplicity of depiction and description, and without limiting the generality of the foregoing, only two cellular telephones are depicted in FIG. 1: a cellular telephone 30 that, by way of example, transmits an MMS message; and a cellular telephone 40 that, by way of example, receives the MMS message transmitted by the cellular telephone 30.

The mobile operator base station 20 preferably includes an MMS center 50 that preferably includes conventional equipment (not shown) for managing MMS messages by, for example, storing and forwarding the MMS messages, and for reformatting the MMS messages as necessary to enable interoperability between MMS messages senders and recipients that have different types of cellular telephones. The MMS center 50 also preferably includes an MMS message dispatcher system 60 that is preferably responsible for dispatching MMS messages managed in the MMS center 50 to targeted recipients. It is appreciated that the dispatcher system 60 may alternatively be a stand-alone system that is operatively associated with the MMS center 50. The MMS message dispatcher system 60 may preferably be implemented in any appropriate combination of hardware and software.

Preferably, the dispatcher system 60 includes the following elements: a dispatcher receiver 70; a dispatcher processor 80; and a dispatcher transmitter 90. The dispatcher receiver 70 may preferably include a cellular telephone receiver, and the dispatcher transmitter 90 may preferably include a cellular telephone transmitter.

The dispatcher receiver 70 preferably receives an MMS message prepared by a creator of the MMS message and provides the MMS message to the dispatcher processor 80. The dispatcher processor 80 preferably obtains the MMS message, and applies personalized metadata to the MMS message for at least one targeted recipient according to preferences of the at least one targeted recipient to produce a personalized MMS message. The dispatcher transmitter 90 is preferably operatively controlled by the dispatcher processor 80 to transmit the personalized MMS message to the at least one targeted recipient, unless the preferences of the at least one targeted recipient indicate that the at least one targeted recipient is not interested in receiving the personalized MMS message.

The at least one targeted recipient may include, by way of example, a user of the cellular telephone 40. The preferences of the at least one targeted recipient may preferably include preferences related to content.

Preferably, the dispatcher system 60 also includes a user preference database 100 which preferably stores the preferences of the at least one targeted recipient. The user preference database 100 is accessible by the dispatcher processor 80.

In operation, a creator of an MMS message prepares the MMS message for sending to at least one targeted recipient via the MMS communication system 10. The creator of the MMS message may, for example, be a content provider and/or a user. By way of example, which is not to be considered as limiting, the cellular telephone 30 is used by the creator both for composing the MMS message and for transmitting the MMS message via the mobile operator base station 20 to a recipient who operates the cellular telephone 40.

When preparing the MMS message, the creator may, for example, include in the MMS message, or otherwise associate with the MMS message, at least one of the following: content; at least one link to content; and at least one pointer to content. The content may preferably include at least one of the following: text; video; a stills image; audio; a software attachment; and bundled multimedia.

The bundled multimedia may preferably include at least one of the following: pop-up multimedia; and animated multimedia. Examples of pop-up multimedia and animated multimedia include the following: Shockwave™ multimedia; Flash™ multimedia; a synchronized multimedia integration language (SMIL) file; and a simple animation format (SAF) file.

The creator may obtain the content from any one or more of various sources. For example, the creator may obtain the content from information, such as video clips, broadcast by a headend (not shown) of a cable or a satellite transmission system. Alternatively, the creator may obtain the content from the Internet or from files stored in the cellular telephone 30. Further alternatively, the creator may obtain the content from files stored in computerized appliances (not shown) that are accessible by the cellular telephone 30.

The at least one link to content may, for example, include a world-wide-web (WWW) link or a link to information broadcast by the headend. The at least one link to content may alternatively or additionally include a link to a data bank (not shown) in the dispatcher system 60.

The at least one pointer to content may preferably include a pointer to a file or a block of information that includes at least one of the following: text; video; a stills image; audio; a software attachment; and bundled multimedia. The bundled multimedia may include pop-up/animated multimedia, such as, for example, at least one of the following: Shockwave™ multimedia; Flash™ multimedia; a SMIL file; and a SAF file.

After preparation of the MMS message, the creator may preferably use the cellular telephone 30 for transmitting the MMS message to the dispatcher system 60. The MMS message is then preferably received at the dispatcher receiver 70 which preferably provides the MMS message to the dispatcher processor 80.

The dispatcher processor 80 preferably retrieves from the user preference database 100 information regarding preferences of the at least one targeted recipient and applies to the MMS message personalized metadata for the at least one targeted recipient according to preferences of the at least one targeted recipient, thereby producing a personalized MMS message. The dispatcher processor 80 then preferably provides the personalized MMS message to the dispatcher transmitter 90, unless the preferences of the at least one targeted recipient indicate that the at least one targeted recipient is not interested in receiving the personalized MMS message. In response to reception of the personalized MMS message from the dispatcher processor 80, the dispatcher transmitter 90 preferably transmits the personalized MMS message to the at least one targeted recipient.

It is appreciated that if the preferences of the at least one targeted recipient indicate that the at least one targeted recipient is not interested in receiving the personalized MMS message, transmission of the personalized MMS message to the at least one targeted recipient is preferably prevented.

The personalized metadata preferably includes metadata determining a personalized format of presentation of the MMS message. The personalized format of presentation of the MMS message may preferably include at least one of the following: a personalized icon based format; and a personalized menu based format. The personalized format of presentation preferably enables selections from at least a portion of content comprised in or associated with the personalized MMS message.

The personalized metadata also preferably includes at least one indicator of at least one of the following: a creator of the MMS message; a provider of at least some content comprised in or associated with the MMS message; an MMS message title keyword; sponsorship of at least some content comprised in or associated with the MMS message; cost of at least some content comprised in or associated with the MMS message; a category in the MMS message; a rating of the MMS message; a duration of at least some content comprised in or associated with the MMS message; a creation time of the MMS message; a validity period of the MMS message; a genre of the MMS message; details of a performer performing in at least some content comprised in or associated with the MMS message; and type of content comprised in or associated with the MMS message.

The indicator of the creator of the MMS message preferably includes or otherwise indicates a name of the creator, typically a sender of the MMS message so that the at least one targeted recipient may identify an entity from whom the MMS message has arrived.

The indicator of the provider of at least some content comprised in or associated with the MMS message may preferably include or otherwise indicate a name of an entity that provides the specific content. For example, if the specific content is a video clip, the indicator of the provider of the video clip may include the name of a broadcaster of the video clip or the name of a producer of the video clip.

The indicator of the MMS message title keyword preferably includes or otherwise indicates at least one title keyword that may be used to identify the title of the MMS message and to enable searches through lists of MMS messages.

If the specific content is sponsored by a sponsor, the indicator of sponsorship preferably includes or otherwise indicates the name of the sponsor.

The indicator of the cost of at least some content comprised in or associated with the MMS message preferably includes or otherwise indicates a cost associated with the MMS message. The cost may preferably be calculated according to a business model. For example, the at least one targeted recipient may be billed for the MMS message or for some content in the MMS message on a rental basis, or billed on a basis of a number of times the MMS message or chargeable content comprised in or associated with the MMS message is played.

The term "category", in all of its grammatical forms, is used throughout the present specification and claims with reference to an MMS message to include a subject group of the MMS message or of content comprised in or associated with the MMS message. The indicator of the category in the MMS message preferably includes or otherwise indicates a subject group to which the MMS message or content comprised in or associated with the MMS message belongs. For example, the indicator of the category in the MMS message may indicate a subject group of news, or a subject group of sports, or any other appropriate subject group. It is appreciated that the indicator of the category in the MMS message may also include or otherwise indicate sub-categories in the MMS message, such as sub-categories of news that relate to news at different geographical regions such as the Middle East, sub-categories of sports that relate to different sports such as football, etc.

The term "rating", mentioned with reference to an MMS message, is used throughout the present specification and claims to include a grade assigned to the MMS message or to content comprised in or associated with the MMS message by an entity such as, for example, a creator of the MMS message or a creator of content associated with the MMS message. Ratings of MMS messages may, for example, be categorized similar to ratings given to movies or according to other criteria such as selection popularity. The indicator of the rating of the MMS message preferably includes or otherwise indicates a rating assigned to the MMS message or to content associated with the MMS message, such as "not suitable for children under 13 years of age" or "highly popular".

The indicator of the duration of at least some content comprised in or associated with the MMS message and the indicator of the creation time of the MMS message are self-explanatory.

The indicator of the validity period of the MMS message preferably includes or otherwise indicates a period of validity of the MMS message. For example, the indicator of the validity period of the MMS message may indicate that the MMS message is valid for 36 hours.

The indicator of the genre of the MMS message is self-explanatory. The indicator of the details of a performer performing in at least some content comprised in or associated with the MMS message preferably includes or otherwise indicates at least one detail of the performer, such as the name of the performer.

The indicator of the type of content comprised in or associated with the MMS message preferably includes or otherwise indicates a content type that includes at least one of the following types: text; video; a stills image; audio; a software attachment; and bundled multimedia.

The personalized MMS message transmitted by the dispatcher transmitter 90 is preferably received at the cellular telephone 40. The received personalized MMS message is preferably processed and prepared for display by apparatus 110 for employing a personalized MMS message that is preferably comprised in the cellular telephone 40 or associated therewith. A preferred embodiment of the apparatus 110 is described below with reference to FIG. 5.

As mentioned above, the MMS message is created in the cellular telephone 30 and transmitted from the cellular telephone 30 to the cellular telephone 40 via the MMS message dispatcher system 60. The MMS message may alternatively be obtained at the MMS message dispatcher system 60 from another source, such as, for example, the mobile operator base station 20 or the MMS center 50. In such a case, the dispatcher processor 80 preferably obtains the MMS message and applies personalized metadata to the MMS message for at least one targeted recipient according to preferences of the at least one targeted recipient to produce a personalized MMS message. The dispatcher transmitter 90 preferably transmits the personalized MMS message to the at least one targeted recipient, unless the preferences of the at least one targeted recipient indicate that the at least one targeted recipient is not interested in receiving the personalized MMS message.

It is appreciated that regardless of whether the MMS message was received from the cellular telephone 30 of from another source, the MMS message is personalized in the MMS message dispatcher system 60.

It is further appreciated that alternative suitable system configurations may be employed for communication of personalized MMS messages to an MMS-receiving communication appliance. Examples, which are not to be considered as limiting, of such alternative system configurations are described below with reference to FIGS. 2-4.

The term "MMS-receiving communication appliance" is used throughout the present specification and claims to include a cellular telephone or any other appropriate communication appliance.

Figure 2:
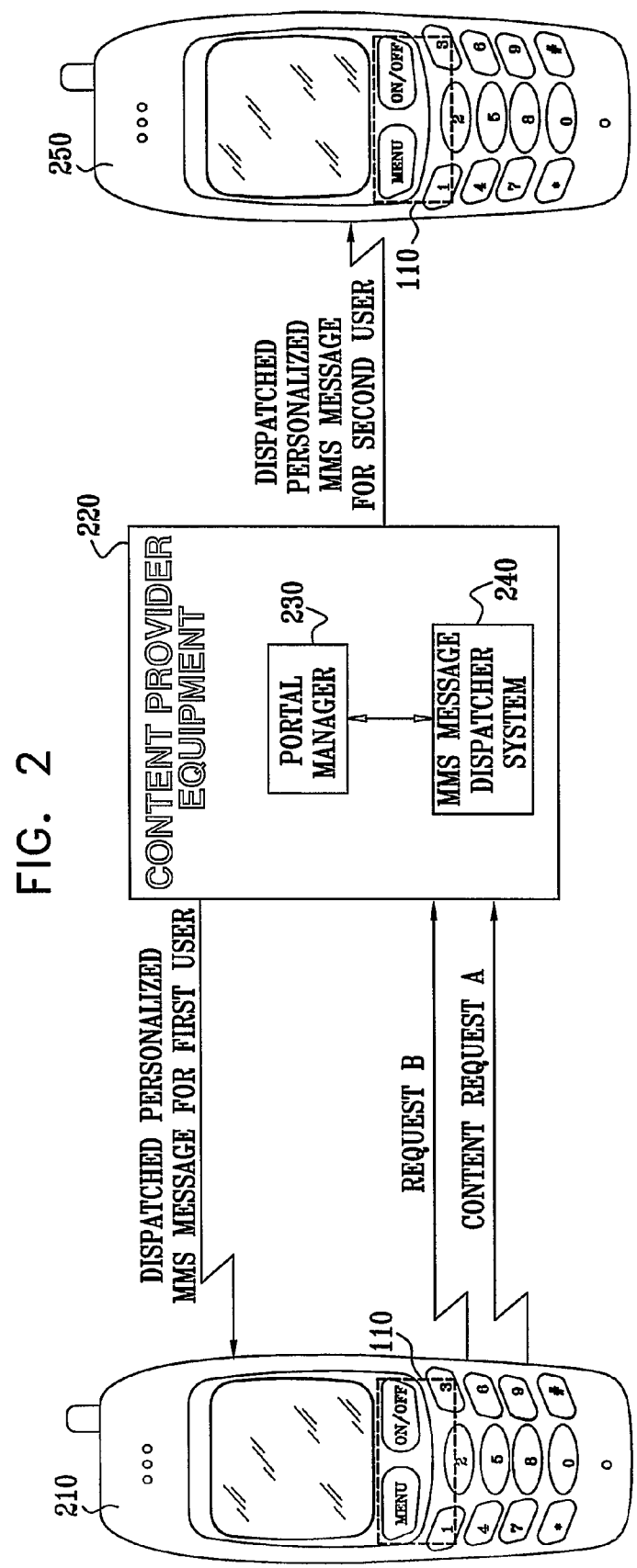
FIG. 2 is a simplified partly pictorial, partly block diagram illustration of another preferred implementation of an MMS communication system constructed and operative in accordance with another preferred embodiment of the present invention.

Reference is now made to FIG. 2, which is a simplified partly pictorial, partly block diagram illustration of another preferred implementation of an MMS communication system 200, constructed and operative in accordance with another preferred embodiment of the present invention.

In the system 200 of FIG. 2, a cellular telephone 210 is preferably used to communicate with content provider equipment 220 of a content provider for receiving a personalized MMS message. The cellular telephone 210 is a non-limiting example of an MMS-receiving communication appliance. The cellular telephone 210 may be similar in structure and function to the cellular telephone 40 of FIG. 1 and may similarly include or be associated with the apparatus 110 of FIG. 1 for employing the personalized MMS message.

The content provider equipment 220 preferably includes or is associated with the following elements: a portal manager 230; and an MMS message dispatcher system 240. The MMS message dispatcher system 240 may preferably be similar in structure and function to the MMS message dispatcher system 60 of FIG. 1.

In operation, a first user employing the cellular telephone 210 preferably transmits a content request A that is received at the content provider equipment 220. In response to the content request A, the portal manager 230 may, for example, create or obtain an MMS message associated with content as requested in the content request A, and apply personalized metadata to the MMS message for the first user according to preferences of the first user, thereby generating a personalized MMS message. The MMS message may, for example, have characteristics and content associated therewith as mentioned above with reference to FIG. 1. The preferences of the first user may preferably include preferences related to content.

Preferably, the portal manager 230 sends the personalized MMS message to the MMS message dispatcher system 240. The MMS message dispatcher system 240 preferably transmits the personalized MMS message to the cellular telephone 210. The cellular telephone 210 preferably receives the personalized MMS message and the apparatus 110 comprised in or associated with the cellular telephone 210 preferably processes the personalized MMS message and prepares the personalized MMS message for use.

In accordance with another preferred embodiment of the present invention, after the first user receives at the cellular telephone 210 the MMS message personalized in accordance with his preferences, the first user may decide to send the MMS message to a second user. In such a case, the first user may preferably use the cellular telephone 210 to transmit, for example to the MMS message dispatcher system 240, a request B to transmit the MMS message to a second communication appliance of the second user. By way of example, which is not to be considered as limiting, the second communication appliance of the second user comprises a cellular telephone 250.

Preferably, in response to the request B, the portal manager 230 applies personalized metadata to the MMS message for the second user according to preferences of the second user, thereby generating a personalized MMS message for the second user. The preferences of the second user preferably include preferences related to content.

Preferably, the portal manager 230 provides the MMS message personalized in accordance with the preferences of the second user to the MMS message dispatcher system 240 for transmission to the cellular telephone 250. The cellular telephone 250 preferably receives the MMS message personalized in accordance with the preferences of the second user from the MMS message dispatcher system 240, and apparatus 110 comprised in or associated with the cellular telephone 250 preferably processes the personalized MMS message and prepares the personalized MMS message for use.

It is appreciated that if the preferences of the second user indicate that the second user is not interested in receiving the personalized MMS message, the MMS message dispatcher system 240 preferably does not transmit the MMS message to the second user.

The preferences of the second user are typically different from the preferences of the first user. For example, the first user may prefer to receive a personalized MMS message with general news headlines in Hebrew. The second user may prefer to receive a personalized MMS message including sports news with stills images and headlines in English. In such a case, when the first user views a news headline (in Hebrew) that relates to a sports news item that may be of interest to the second user, the first user may transmit a request to the content provider equipment 220 requesting transmission of the sports news item to the second user. The MMS message dispatcher system 240 may then preferably transmit the sports news item to the second user as an MMS message with stills images and headlines in English.

Figure 3:
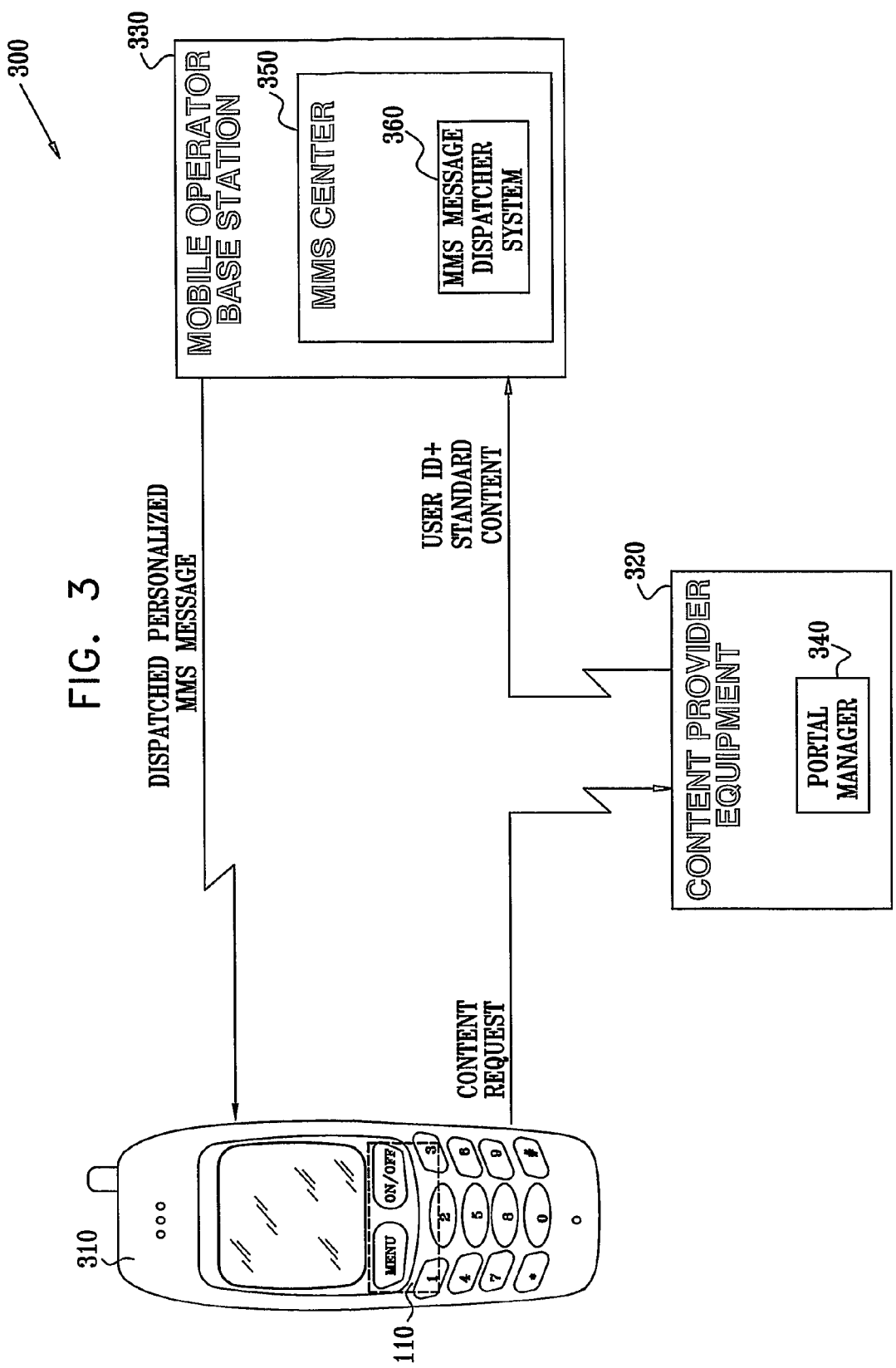
FIG. 3 is a simplified partly pictorial, partly block diagram illustration of yet another preferred implementation of an MMS communication system constructed and operative in accordance with yet another preferred embodiment of the present invention.

Reference is now made to FIG. 3, which is a simplified partly pictorial, partly block diagram illustration of yet another preferred implementation of an MMS communication system 300 constructed and operative in accordance with yet another preferred embodiment of the present invention.

In the system 300 of FIG. 3, a cellular telephone 310 is preferably used to communicate with content provider equipment 320 of a content provider and with a mobile operator base station 330 for receiving a personalized MMS message. The cellular telephone 310 is a non-limiting example of an MMS-receiving communication appliance. The cellular telephone 310 may be similar in structure and function to the cellular telephone 40 of FIG. 1 and may similarly include or be associated with the apparatus 110 of FIG. 1 for employing the personalized MMS message.

The content provider equipment 320 may preferably include a portal manager 340. The mobile operator base station 330 may preferably include an MMS center 350 that may be similar in structure and function to the MMS center 50 of FIG. 1. The MMS center 350 may preferably include or be associated with an MMS message dispatcher system 360 that is preferably responsible for dispatching MMS messages managed in the MMS center 350 to targeted recipients. The MMS message dispatcher system 360 may be similar in structure and function to the MMS message dispatcher system 60 of FIG. 1.

In operation, a user of the cellular telephone 310 may preferably transmit a content request to the content provider equipment 320. In response to the content request, the portal manager 340 preferably transmits standard content and user identification of the user to the MMS message dispatcher system 360. The term "standard content" is used throughout the present specification and claims to include content that is typically provided in a form suitable for many users and is not personalized. It is appreciated that the standard content may be provided in or associated with an MMS message. The MMS message may, for example, have characteristics and content associated therewith as mentioned above with reference to FIG. 1.

Preferably, the MMS message dispatcher system 360 employs the user identification to locate and retrieve preferences of the user, which preferences may be stored in a user preference database (not shown in FIG. 3) comprised in or associated with the MMS message dispatcher system 360. The user preference database may be similar in structure and function to the user preference database 100 of FIG. 1. The preferences of the user may preferably include preferences related to content.

Preferably, the MMS message dispatcher system 360 applies personalized metadata to the MMS message to obtain a personalized MMS message for the user. The MMS message dispatcher system 360 then preferably transmits the personalized MMS message to the cellular telephone 310 of the user.

Figure 4:
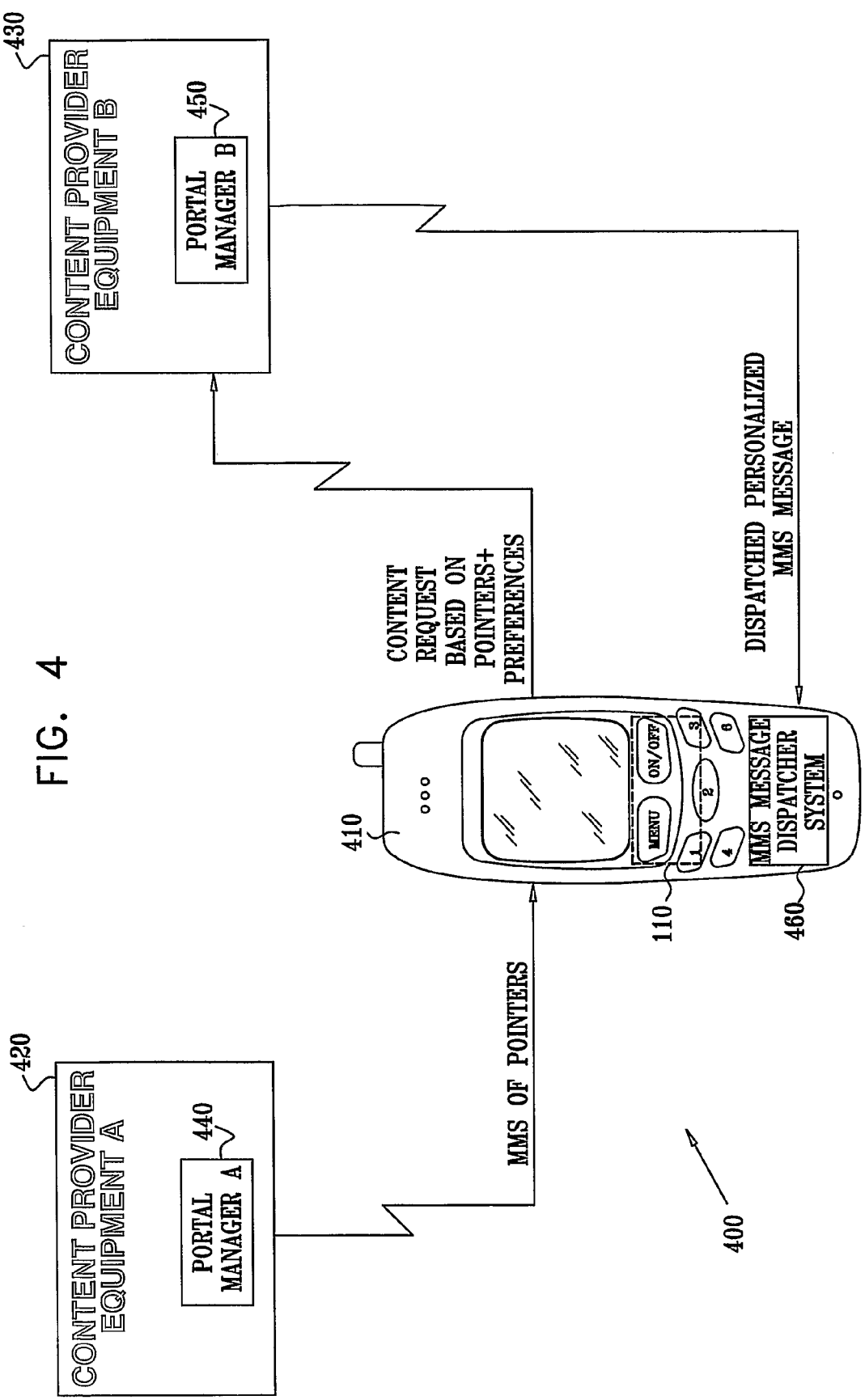
FIG. 4 is a simplified partly pictorial, partly block diagram illustration of still another preferred implementation of an MMS communication system constructed and operative in accordance with still another preferred embodiment of the present invention.

Reference is now made to FIG. 4, which is a simplified partly pictorial, partly block diagram illustration of still another preferred implementation of an MMS communication system 400 constructed and operative in accordance with still another preferred embodiment of the present invention.

In the system 400 of FIG. 4, a cellular telephone 410 is preferably used to communicate with content provider equipment 420 of a content provider A and with content provider equipment 430 of a content provider B. The content provider equipment 420 preferably includes a portal manager 440; the content provider equipment 430 preferably includes a portal manager 450. The cellular telephone 410 is a non-limiting example of an MMS-receiving communication appliance. Preferably, the cellular telephone 410 includes an MMS message dispatcher system 460 that may be similar in structure and function to the MMS message dispatcher system 60 of FIG. 1. The cellular telephone 410 may also preferably include or be associated with the apparatus 110 of FIG. 1 for employing a personalized MMS message.

In operation, a user of the cellular telephone 410 may preferably receive, for example from the portal manager 440, an MMS message including pointers to requested information. The user may then preferably create a content request based on the pointers and on preferences of the user and use the cellular telephone 410 to transmit the content request to, for example, the portal manager 450. The portal manager 450 preferably processes the content request to create a personalized MMS message by obtaining requested content and associating personalized metadata for the user with the requested content. The portal manager 450 then preferably transmits the personalized MMS message to the cellular telephone 410, where the personalized MMS message is displayed to the user in a personalized format of presentation. The personalized format of presentation may preferably include at least one of the following: a personalized icon based format; and a personalized menu based format.

The system 400 of FIG. 4 may, for example, be useful in cases where the content provider equipment 420 has limited MMS capabilities compared to the content provider equipment 430, and the content provider A and the content provider B have a cooperation agreement for providing MMS messages. In such a case, the content provider equipment 430 may provide an enhancement to the MMS capabilities of the content provider equipment 420, thus enabling provision of a level of personalization as requested by the user. For example, the content provider equipment 420 may have capabilities for sending business news in text only, while the content provider equipment 430 may have video capabilities for sending business news in video. In such a case, if, for example, the preferences of the user require a personalized format of presentation of business news to be in video and text, the content provider equipment 420 and 430 may cooperate according to the system configuration as shown in FIG. 4 to provide the personalized format of presentation according to the preferences of the user.

It is appreciated that the content providers A and B may alternatively comprise a single entity. In such a case, the content provider equipment 420 and the content provider equipment 430 may be comprised in a single element and the portal managers 440 and 450 may also be comprised in a single element.

Figure 5:
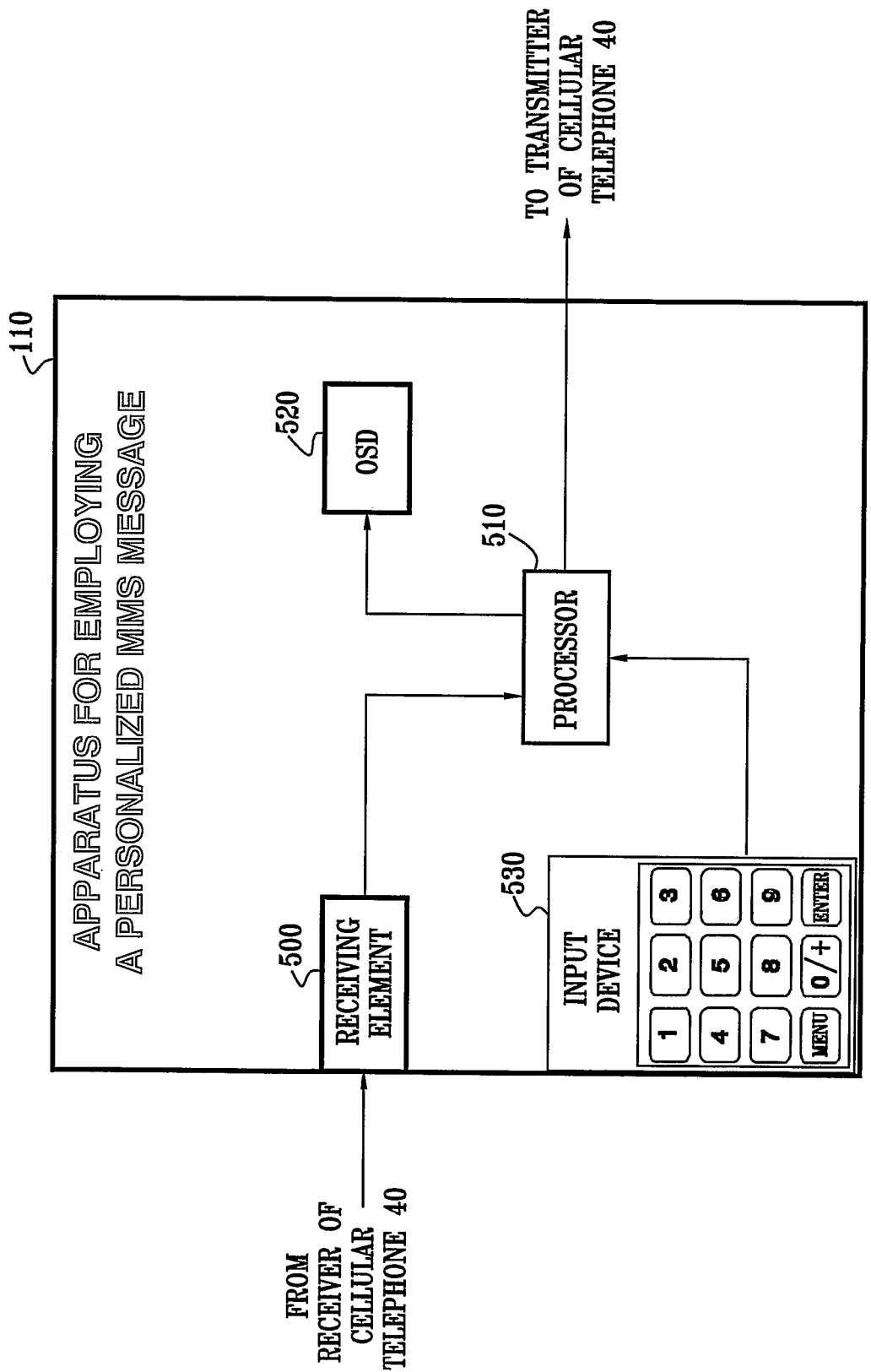
FIG. 5 is a simplified partly pictorial, partly block diagram illustration of a preferred implementation of apparatus comprising a portion of the systems of FIGS. 1-4, the apparatus being constructed and operative in accordance with a preferred embodiment of the present invention.

Reference is now made to FIG. 5, which is a simplified partly pictorial, partly block diagram illustration of a preferred implementation of the apparatus 110 of FIGS. 1-4, the apparatus 110 being constructed and operative in accordance with a preferred embodiment of the present invention.

The apparatus 110 may be embodied in a communication appliance, such as a cellular telephone that may, for example, include any one of the following: the cellular telephone 40 of FIG. 1; the cellular telephones 210 and 250 of FIG. 2; the cellular telephone 310 of FIG. 3; and the cellular telephone 410 of FIG. 4. The apparatus 110 may alternatively comprise a stand-alone apparatus which is associated with a cellular telephone or with any other suitable communication appliance that communicates via any of the MMS communication systems 10, 200, 300 and 400. For example, the apparatus 110 may be embodied in an STB (not shown) having a cellular telephony link for communicating via the MMS communication system 10.

The apparatus 110 is preferably implemented in any appropriate combination of hardware and software. Preferably, the apparatus 110 includes the following elements: a receiving element 500; a processor 510; an on-screen display (OSD) unit 520; and an input device 530. The input device 530 may comprise any appropriate input device such as, for example, any one or a combination of the following: a keypad; a keyboard; and a mouse input device.

The receiving element 500 preferably receives a personalized MMS message, for example, from a conventional receiving unit (not shown) of a cellular telephone such as the cellular telephone 40 of FIG. 1. The processor 510 preferably processes personalized metadata associated with the personalized MMS message to generate personalized parameters determining a format of presentation of at least a portion of content comprised in or associated with the personalized MMS message, and uses the personalized parameters in an electronic content guide (ECG). The ECG may preferably be displayed by the OSD unit 520. Examples of the ECG, which are not to be considered as limiting, are described below with reference to FIGS. 6A-6D.

The format of presentation may preferably include at least one of the following: an icon based format; and a menu based format. Preferably, the format of presentation includes a format of presentation that is adapted for performance of selections from the at least a portion of content comprised in or associated with the personalized MMS message.

In operation, the apparatus 110 receives a personalized MMS message at the receiving element 500. The processor 510 preferably processes personalized metadata associated with the personalized MMS message to generate personalized parameters determining a format of presentation of at least a portion of content comprised in or associated with the personalized MMS message.

After generating the personalized parameters, the processor 510 may preferably use the personalized parameters in an ECG which is displayed by the OSD unit 520 on a display of a cellular telephone in which the apparatus 110 is comprised or with which the apparatus 110 is associated. Preferably, the processor 510 uses the personalized parameters by employing at least some of the personalized parameters to create a personalized structure of the ECG, which ECG may be used by a user for entering selections and carrying out operations on the at least a portion of the content comprised in or associated with the personalized MMS message.

Preferably, after the ECG is displayed to the user, the user is enabled to view and/or to listen to the at least a portion of the content comprised in or associated with the personalized MMS message. It is appreciated that enabling the user to view and/or to listen to the at least a portion of the content may be in response to an indication of agreement by the user to pay for viewing and/or listening to the at least a portion of the content. Such an indication of agreement to pay may be entered by the user, for example, via the input device 530. It is appreciated that the indication of agreement to pay that is entered by the user may be provided to the processor 510 for authentication and verification. Appropriate methods of providing indications of agreement to pay and of authentication and verification of such indications of agreement to pay are well known in the art.

The user may also, for example, use the input device 530 to enter a request to transmit the MMS message to another user. In such a case, the request is preferably processed by the processor 510 and provided to a transmitter (not shown) of the communication appliance which transmits the request.

Reference is now made to FIGS. 6A-6D, which together constitute simplified pictorial illustrations of examples of an ECG usable with the systems of FIGS. 1-4 and with the apparatus of FIG. 5, the ECG being constructed and operative in accordance with a preferred embodiment of the present invention.

Figure 6A:
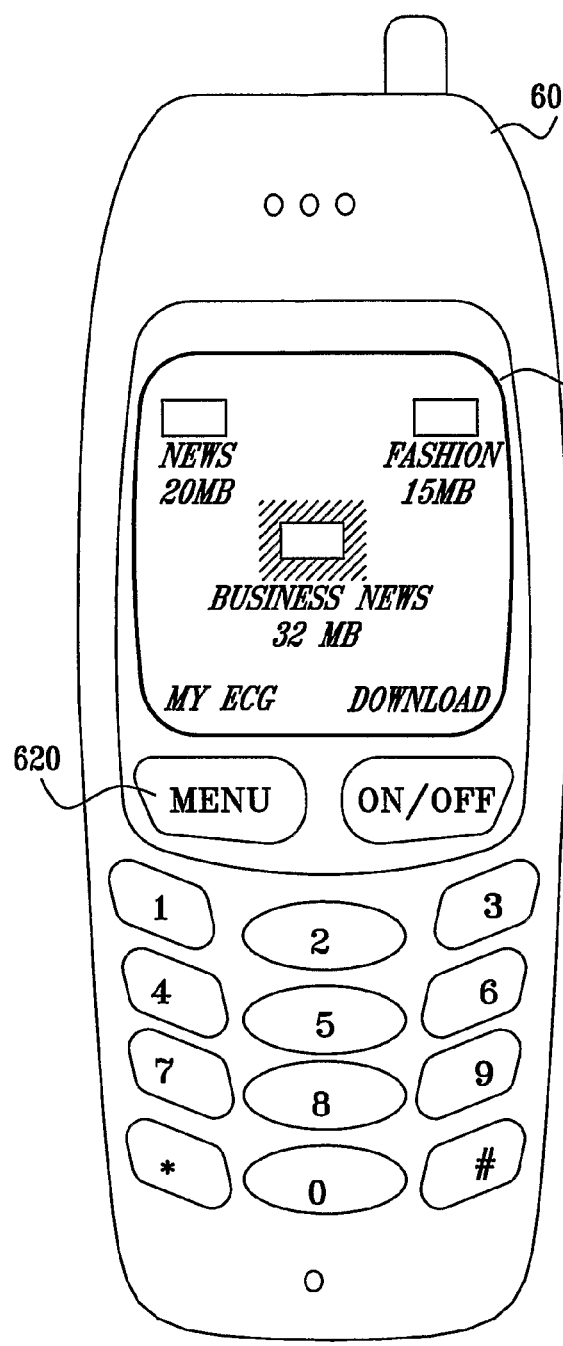
Figure 6B:
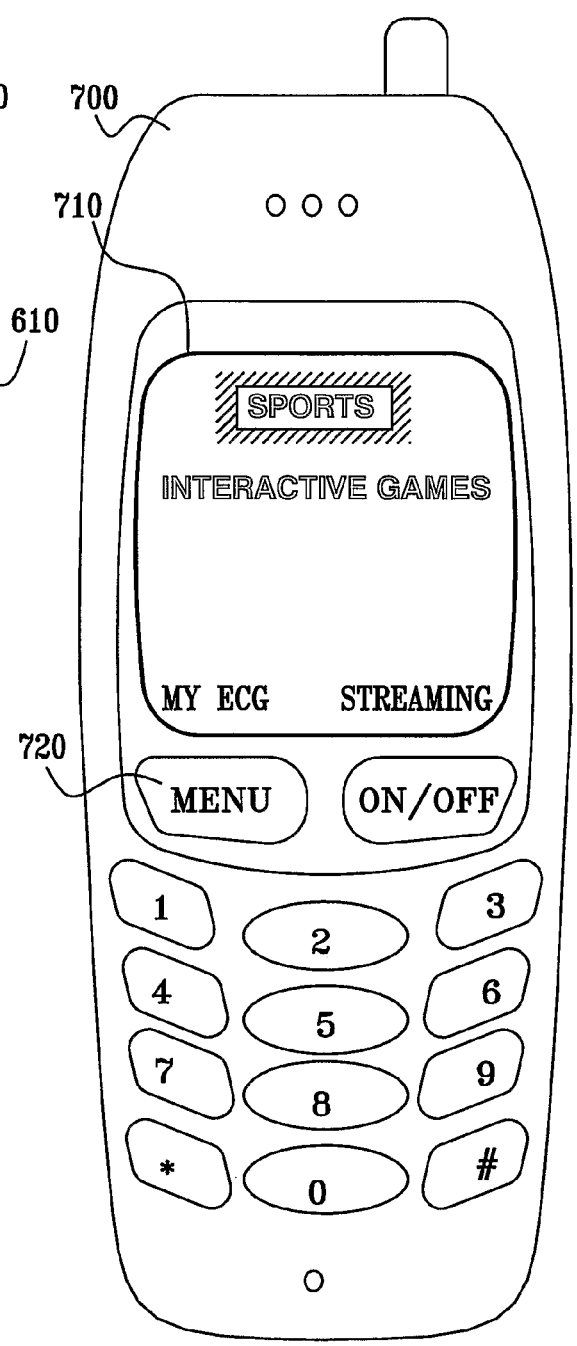

FIGS. 6A and 6B depict examples, which are not to be considered as limiting, of different personalized formats of presentation of the ECG and of MMS messages accessible via the ECG in two cellular telephones 600 and 700 which may, for example, belong to two different users. The different personalized formats of presentation may typically be separately configured, by the two different users via the respective cellular telephones 600 and 700, by inputting different personalized parameters.

In FIG. 6A, the format of presentation of the ECG is, by way of example, provided as a personalized icon based format that is displayed on a display 610 of the cellular telephone 600. The personalized icon based format enables a first user to make selections via the cellular telephone 600 from content associated with a first personalized MMS message that is received at the cellular telephone 600. By way of example, the personalized icon based format is arranged as a set of icons with descriptors in a format which uses an italic font. Each content item in the first personalized MMS message may be associated with a size, for example in bytes. By way of example, a downloading mechanism is used as a type of delivery in which the first user may download each content item and play a downloaded item at the user's discretion and at times selected by the user without having to be continuously connected on-line when the first personalized MMS message and/or content associated with the first personalized MMS message is being played.

Further by way of example, it is assumed that the first user selects the item "Business News". In response to such a selection, a display screen as depicted in FIG. 6C may be presented to the first user, where the display screen displays text and graphics of business news content associated with the first personalized MMS message. The first user may then, for example, select a "save" option for saving the business news content in a memory (not shown) in the cellular telephone 600. Selection of the "save" option may be performed in a conventional way, for example, by pressing a "menu" key 620 and then pressing an appropriate key on the cellular telephone 600.

In FIG. 6B, the format of presentation of the ECG is, by way of example, provided as a personalized menu based format that is displayed on a display 710 of the cellular telephone 700. The personalized menu based format enables a second user to make selections via the cellular telephone 700 from content associated with a second personalized MMS message that is received at the cellular telephone 700. By way of example, the personalized menu based format includes a list of broadcast or interactive items with descriptors in a format which uses an outline font.

Further by way of example, each content item comprises audio/video (A/V) information that may be displayed on the display 710, and a streaming mechanism is used as a type of delivery which enables viewing of streamed content including A/V. In such a case, the second user may view the second personalized MMS message; however, in order to view and listen to streamed content comprised in or associated with the second personalized MMS message, the second user must be connected on-line.

By way of example, it is assumed that the second user selects a broadcast of a sports item (the first item in the list in FIG. 6B). In response to such a selection, a display screen as depicted in FIG. 6D may be presented to the second user, where the display screen displays a broadcast video program including a highlight of a sports game, which highlight is associated with the second personalized MMS message.

In the examples depicted in FIGS. 6A-6D personalization differences between the different formats of presentation preferably include the following: font type; display of text and graphics vs. display of a video program; and display of different varieties of content items. It is however appreciated that additional personalization parameters may be used that may provide further personalization capabilities. Such additional personalization parameters may preferably be related to content and include, but not limited to, the following: a message or attachment size; total transmitted data bytes per a period of time, such as a day; content rating; type of transmitted information, such as good news vs. bad news; a payment threshold; a genre of transmitted information; a title keyword in the message or a message attachment; a validity period of the message; and details of a performer performing in at least some content comprised in or associated with the message.

Figure 7:
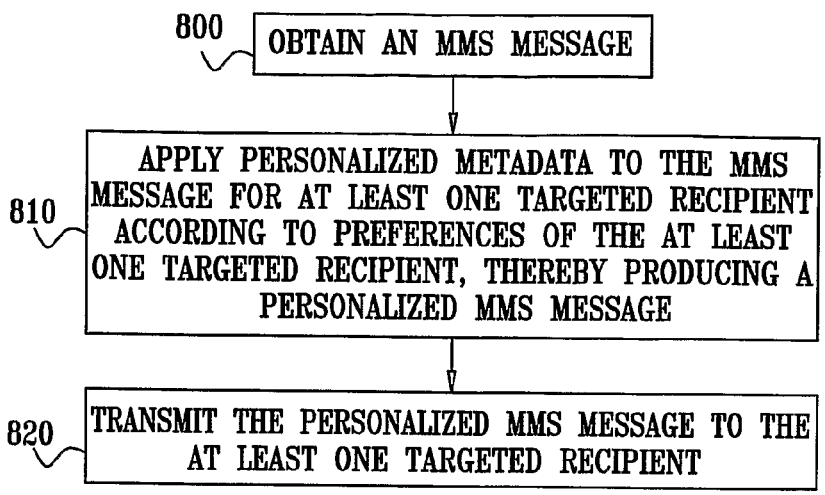
FIG. 7 is a simplified flowchart illustration of a preferred method of operation of a dispatcher system usable in any of the systems of FIGS. 1-4.

Reference is now made to FIG. 7, which is a simplified flowchart illustration of a preferred method of operation of the dispatcher system 60 of FIG. 1, it being appreciated that the dispatcher system 240 of FIG. 2, the dispatcher system 360 of FIG. 3, and the dispatcher system 460 of FIG. 4 may each be similar in structure and function to the dispatcher system 60 of FIG. 1. The method of FIG. 7 preferably comprises the following steps:

An MMS message is obtained (step 800) for use in a personalized multimedia messaging service. Personalized metadata for at least one targeted recipient is applied (step 810) to the MMS message according to preferences of the at least one targeted recipient, thereby producing a personalized MMS message. The personalized MMS message is transmitted (step 820) to the at least one targeted recipient, unless the preferences of the at least one targeted recipient indicate that the at least one targeted recipient is not interested in receiving the personalized MMS message.

Figure 8:
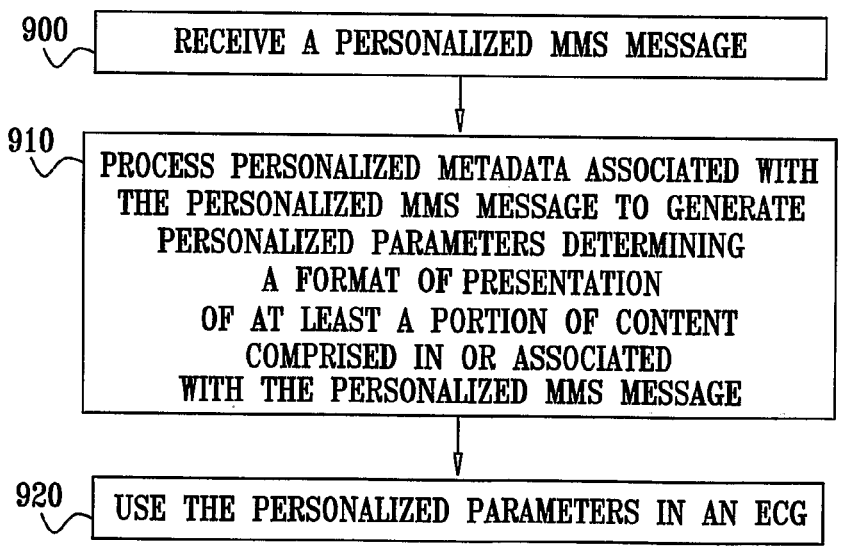
FIG. 8 is a simplified flowchart illustration of a preferred method of operation of the apparatus of FIG. 5.

Reference is now made to FIG. 8, which is a simplified flowchart illustration of a preferred method of operation of the apparatus 110 of FIG. 5. The method of FIG. 8 is self-explanatory.

Figure 9:
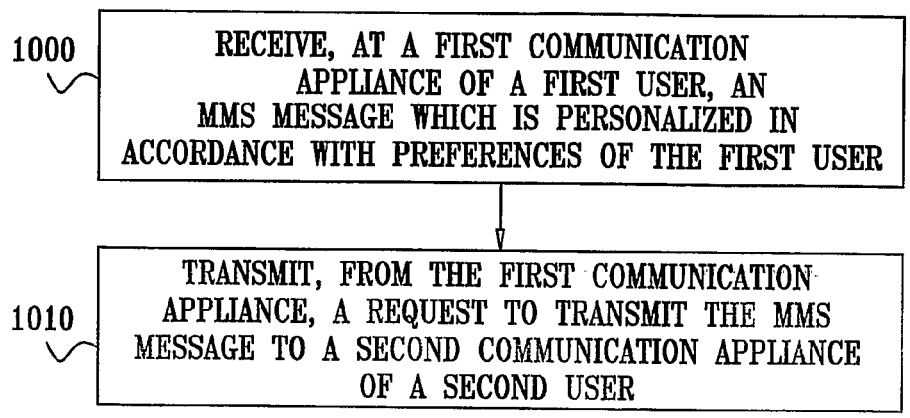
FIG. 9 is a simplified flowchart illustration of another preferred method of operation of the apparatus of FIG. 5.

Reference is now made to FIG. 9, which is a simplified flowchart illustration of another preferred method of operation of the apparatus 110 of FIG. 5. The method of FIG. 9 preferably comprises the following steps:

An MMS message which is personalized in accordance with preferences of a first user is received (step 1000) at a first communication appliance of the first user. A request to transmit the MMS message to a second communication appliance of a second user is transmitted (step 1010) from the first communication appliance, for example, to an MMS message dispatcher system.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for employing a personalized multimedia messaging service (MMS) message to create and display an electronic content guide (ECG) in a communication appliance, the method comprising:
   receiving the personalized MMS message by the communication appliance; then processing personalized metadata associated with the personalized MMS message by the communication appliance to generate personalized parameters determining a format of presentation of at least a portion of content comprised in or associated with the personalized MMS message; then
   employing at least some of the personalized parameters by the communication appliance to create a personalized structure of the ECG; and
   displaying the personalized ECG by the communication appliance.

2. The method according to claim 1 and also comprising enabling a user to view the at least a portion of content comprised in or associated with the personalized MMS message in response to an indication of agreement by the user to pay for viewing the at least a portion of content.

3. The method according to claim 1 and also comprising enabling a user to listen to the at least a portion of content comprised in or associated with the personalized MMS message in response to an indication of agreement by the user to pay for listening to the at least a portion of content.

4. The method according to claim 1 and wherein said format of presentation comprises at least one of the following: an icon based format; and a menu based format.

5. The method according to claim 1 and wherein said format of presentation comprises a format of presentation adapted for performance of selections from the at least a portion of content comprised in or associated with the personalized MMS message.

6. Apparatus for employing a personalized multimedia messaging service (MMS) message to create an electronic content guide (ECG), the apparatus comprising:
   a receiving element to receive the personalized MMS message;

a processor to:

processed personalized metadata associated with the personalized MMS message to generate personalized parameters determining a format of presentation of at least a portion of content comprised in or associated with the personalized MMS message, and then to employ at least some of the personalized parameters to create a personalized structure of the ECG; and an on-screen display unit to display the personalized ECG.

7. A cellular telephone comprising the apparatus of claim 6.

8. A set-top box (STB) comprising the apparatus of claim 6.

9. Apparatus for employing a personalized multimedia messaging service (MMS) message to create an electronic content guide (ECG), the apparatus comprising:

means for receiving the personalized MMS message;

means for processing personalized metadata associated with the personalized MMS message to generate personalized parameters determining a format of presentation of at least a portion of content comprised in or associated with the personalized MMS message;

means for employing at least some of the personalized parameters to create a personalized structure of the ECG; and means for displaying the personalized ECG.

* * * * *

UNITED STATES PATENT AND TRADEMARK OFFICE
CERTIFICATE OF CORRECTION

| | | |
|---|---|---|
| PATENT NO. | : 8,219,123 B2 | Page 1 of 1 |
| APPLICATION NO. | : 10/590002 | |
| DATED | : July 10, 2012 | |
| INVENTOR(S) | : Joseph Deutsch et al. | |

It is certified that error appears in the above-identified patent and that said Letters Patent is hereby corrected as shown below:

Title page, item (57), please delete the abstract in its entirety and insert therefore:

--A method for employing a personalized multimedia messaging service (MMS) message to create and display an electronic content guide (ECG) in a communication appliance, the method including receiving the personalized MMS message by the communication appliance, then processing personalized metadata associated with the personalized MMS message by the communication appliance to generate personalized parameters determining a format of presentation of at least a portion of content comprised in or associated with the personalized MMS message, then employing at least some of the personalized parameters by the communication appliance to create a personalized structure of the ECG, and displaying the personalized ECG by the communication appliance. Related apparatus and methods are also described.--

Signed and Sealed this
Eighteenth Day of September, 2012

David J. Kappos
*Director of the United States Patent and Trademark Office*